A. G. PAUL.
VALVE DEVICE FOR USE IN HEATING SYSTEMS.
APPLICATION FILED AUG. 10, 1912.
1,271,212.
Patented July 2, 1918.
2 SHEETS—SHEET 1.
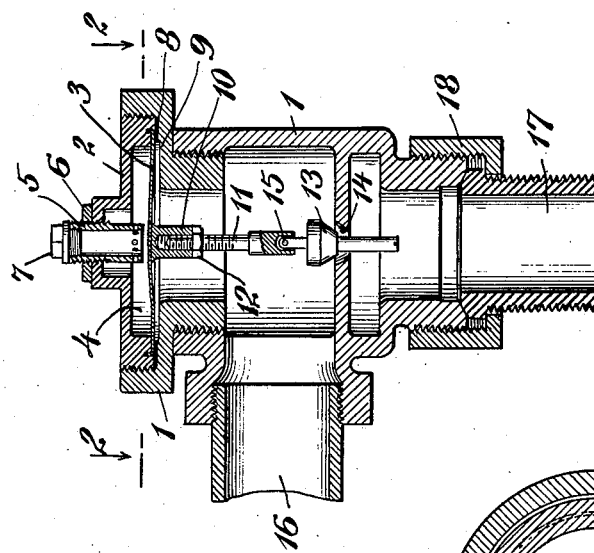
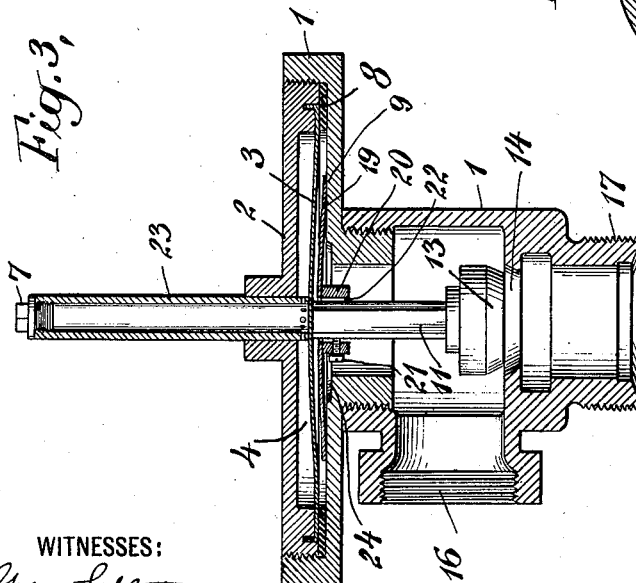
WITNESSES:
George Schlatt
J. O. Templer
INVENTOR
Andrew G. Paul
BY
Kenyon & Kenyon
ATTORNEYS A. G. PAUL.
VALVE DEVICE FOR USE IN HEATING SYSTEMS.
APPLICATION FILED AUG. 10, 1912.
1,271,212.
Patented July 2, 1918.
2 SHEETS—SHEET 2.
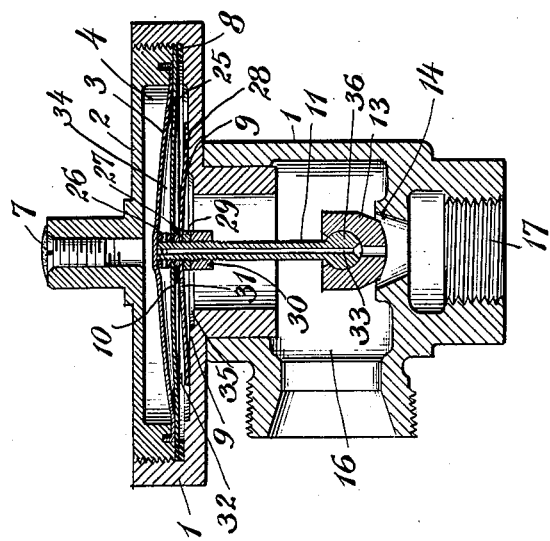
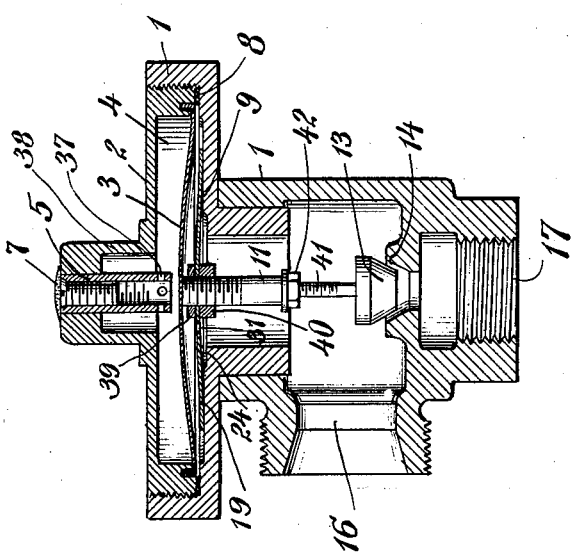
WITNESSES:
George Schlatt
J. O. Templer
INVENTOR
Andrew G. Paul
BY
Kenyon & Kenyon
ATTORNEYS

UNITED STATES PATENT OFFICE.

ANDREW G. PAUL, OF BOSTON, MASSACHUSETTS.

VALVE DEVICE FOR USE IN HEATING SYSTEMS.

1,271,212.  Specification of Letters Patent.  Patented July 2, 1918.

Application filed August 10, 1912. Serial No. 714,389.

*To all whom it may concern:*

Be it known that I, ANDREW G. PAUL, a citizen of the United States, and a resident of Boston, in the county of Suffolk and State of Massachusetts, have invented a new and useful Improvement in Valve Devices for Use in Heating Systems, of which the following is a specification.

This invention relates to a valve device for use in heating systems wherein steam, or other suitable heating agent, is circulated for the purpose of conveying and imparting heat.

The object of my invention is to provide a valve device which will permit the escape of the water of condensation and of the air and other gases that would otherwise tend to collect in the heating system, but at the same time to prevent the escape or loss of any substantial quantity of steam or heating agent, and to do this automatically according to the conditions of temperature, or temperature and pressure, that exist within the device, and according to the condition of the external temperature to which the valve is subjected. Another object of the invention is to produce a valve device that is sensitive in its operation, and that will operate within a relatively narrow change of conditions within and without the system. Another object of the invention is to so construct the valve device that it will be durable and will not be put out of operation, or permanently disarranged, by extremes of temperature and pressure that may exist in the system at certain times.

My invention consists first in providing a chamber to contain an expansible fluid, one part or side of said chamber being so arranged as to be exposed to the temperature of the room to be heated, and another part or wall of said chamber being adapted to be exposed to the temperature of the fluid passing through the valve device at or near the valve proper, as a result of which the action of the valve will be controlled jointly by the variations of the external and internal temperatures. In the best form of my valve the inner wall or part of the chamber is exposed to the temperature and pressure of the fluid contents of the valve device on the inlet side of the valve proper, and the inner wall of the valve device is made in the form of a movable diaphragm which is connected with the valve proper so as to operate the said valve.

My invention also consists in providing a stop connected with the valve casing directly or indirectly, and adapted to limit the motion of the diaphragm toward the valve seat so as to prevent the diaphragm from being unduly extended or bent, and so as to prevent the valve proper from being pressed against the valve seat with undue pressure. My invention also consists in providing a spring device suitably supported within the casing and adapted to resist the motion of the diaphragm toward the valve seat. In the best form of my invention the spring device is made in the form of one or more spring disks which are placed between the diaphragm and the wall of the casing, and are preferably mounted upon or carried by the valve stem. My invention also consists in forming a fluid pressure chamber between the disks, or the outer spring disk and the diaphragm, and in connecting this fluid pressure chamber with the discharge pipe or passage beyond the valve proper, whereby when the valve is closed the outer surface of the disk is subjected to the discharge pressure, that is to say, to the pressure which exists in the discharge pipe beyond the valve proper. My invention also consists in providing an extension of the outer wall of the chamber for the expansible fluid, either in the form of a tube extending from the outer wall or in some other suitable manner, so as to increase the area of this outer wall or surface of said chamber which is exposed to the outside temperature, whereby the valve is made more sensitive to variations in the said outside temperature.

My invention also consists in other features of construction, and in various combinations of the parts already mentioned, all as hereinafter described and claimed.

My invention is fully shown in the accompanying drawings in which Figure 1 is a cross-sectional view of one form of my improved valve device; Fig. 2 is a sectional view of the device shown in Fig. 1, taken on the line 2—2 of Fig. 1, looking in the direction of the arrows; Figs. 3, 4 and 5 are cross-sectional views of various forms or modifications of my invention.

Similar numbers denote similar parts in the different figures.

Referring to Figs. 1 and 2, 1 is a casing made of any suitable heat-conducting material. 2 is a cap which is adapted to be screwed into the casing, as illustrated in the drawing, or connected with the casing in any other suitable manner. The cap is also made of heat-conducting material. I prefer to make the cap and the casing of brass by reason of its heat-conducting qualities. The cap 2 is provided with a suitable recess adapted to form a fluid-pressure chamber. 3 is a diaphragm which is connected with the cap in any suitable way so as to form a fluid-pressure chamber 4 between itself and the outer wall of the cap 2. 5 is a screw-threaded tube which is screwed into the cap 2 and is locked in place on the cap by means of the nut 6. 7 is a nut or closure to close the outer end of the tube 5. The expansible fluid is introduced into the chamber 4 through the tube 5. The lower end of the tube 5 also acts as a stop to limit the outward motion of the diaphragm. It can be adjusted by being screwed in and out so as to limit the outer motion of the diaphragm to any desired extent. 8 is a washer which is placed between the cap 2 and the casing 1 to make a tight joint. The casing 1 is provided with a surface 9 which is adapted to operate as a stop to limit the motion of the diaphragm toward the valve seat. The diaphragm 3 is provided with a central boss 10 which has a screw-threaded recess or hole to receive the outer end of the valve stem 11. The valve stem is screw-threaded and can be screwed back and forth in the recess of the boss 10 so as to be properly adjusted, and is held in place by the lock nut 12. 13 is the valve proper which is adapted to bear against the valve seat 14 so as to close the opening or thoroughfare. The valve 13 is fastened to the valve stem by a pivotal connection 15, as a result of which the valve 13 will adjust itself to its seat even if the stem 11 is out of alinement. 16 is the inlet pipe leading into the valve device, and 17 is the outlet or discharge pipe. The discharge pipe is shown to be connected with the valve device by means of the union or coupling 18. The fluid pressure chamber 4 is filled with an expansible fluid. I prefer to use a light fluid which expands at a relatively low temperature such as naphtha or alcohol.

The operation of this valve is as follows: Assuming that the valve is in its normal open position as represented in Fig. 1, if air or cold water flows into the valve through the pipe 16, it will flow out through the discharge opening without affecting the position of the valve. When steam or hot water flows into the valve, heat will be transmitted through the diaphragm 3 to the expansible fluid in the chamber 4, and this will tend to force the diaphragm downwardly so as to move the valve 13 toward or against its seat. If the expansible fluid is sufficiently heated, the downward motion of the diaphragm will continue until the diaphragm strikes against the surface 9 of the casing when its downward motion will be arrested. The valve is so adjusted that in this position the valve will be entirely or substantially closed. Should the expansible fluid be still further expanded the diaphragm has the capacity of bending down somewhat farther at the middle portion. The operation of the valve is, however, effected and partly controlled by the temperature of the outside atmosphere or the air of the room to which the outer wall of the casing and the cap 2 are exposed. Heat is transmitted from the expansible fluid through the wall of the casing and through the cap 2 to the outer atmosphere, and there is a tendency in this way to cool the expansible fluid depending upon the temperature of this outside atmosphere. The expansion of the expansible fluid depends upon the resultant or joint effect of the two temperatures referred to. As the heat of the escaping contents of the radiator or other device increases, the tendency is to close the valve and vice versa. As the heat of the outside atmosphere increases, the tendency is to close the valve or keep it closed. It follows from this that if the air of the room or outside atmosphere is very warm, the valve may not open even though the contents of the radiator near the valve are cold, and even though the temperature of the contents of the valve casing itself immediately next to the diaphragm is low. The valve can be so adjusted that when the room is warm, or heated to the predetermined temperature, it will not open even though the water of condensation has accumulated in the radiator and in sufficient quantity to have grown comparatively cool near the valve. Again, the downward or inward motion of the diaphragm is also resisted by whatever pressure there may be in the radiator outlet, that is to say, in the pipe 16, as this pressure bears against the lower surface of the diaphragm 3. I have found in practice that by exposing the inner surface of the diaphragm to the pressure in the radiator outlet, the operation of the valve can be made more sensitive and can be more readily adjusted to meet the conditions that exist in the particular system. The effect of the pressure can be increased or decreased by increasing the size of the diaphragm relatively to the size of the valve opening or thoroughfare. When the contents of the valve become cool, or when relatively cold air and water flow to the valve or fill it, the expansible fluid is contracted and the valve will be opened so as to discharge the water and air, provided the temperature of the room or outside temperature is not sufficiently high to counteract the cooling effect of the water and the air. When the valve opens and the water and air have been discharged, it will close again as soon as steam or other hot contents come into contact with the diaphragm.

It is obvious that the construction and operation of the valve can be changed and adjusted so as to meet different and varying conditions by changing the relative sizes of the chamber inclosing the expanding fluid, and particularly of the diaphragm and outer wall of the chamber. For example, by increasing the size of the outer wall of the chamber relatively to the size of the diaphragm, the influence of any change of temperature in the outside atmosphere will be increased. On the other hand, by decreasing the size of the outer wall of this chamber relatively to the size of the diaphragm, or by increasing the size of the diaphragm relatively to the size of the outer wall, the influence of the inside temperature would be increased relatively to the influence of the outside temperature. Thus valves may be constructed in which the influence of the outside temperature would largely preponderate, and, on the other hand, valves could be constructed in such a way that the influence of the inside temperature would largely preponderate.

The valve may be so arranged that when hot water flows into the valve from the system, the valve will not be entirely closed but will be left slightly open so that there will be a slight escape of water, but the opening of the valve will be so slight that when steam flows to the valve, even though it be of the same temperature, there will be no substantial escape of steam.

Some of the advantages of the invention would be realized even if the valve were reversed, and the radiator outlet were connected with the pipe 17; but to secure the full advantages of the invention the radiator outlet must be connected with the pipe 16.

Referring to Fig. 3, similar parts are shown as in Fig. 1, and are similarly numbered. 19 is a disk which is made of some suitable form of spring metal, and which is bent upwardly at its center, as shown in this figure, and the outer edge of the circumference of which rests against the surface 9 of the casing. The disk 19 is fastened to a collar 20 which surrounds the valve stem 11 and which is adjusted thereon and fastened thereto by the screw 21. By means of this screw the collar 20 can be moved up and down on the stem 11 so as to properly regulate and adjust the position of the disk 19. The parts are so adjusted that the upper part of the stem 11 bears against the under face of the diaphragm 3, as shown. 22 is a small passage through the collar 20 connecting the inner chamber of the valve with the chamber between the diaphragm 3 and the spring disk 19 so that the under or inner face of the diaphragm is subjected to the pressure which exists inside of the valve device. 23 is a tubular projection or extension of the cap 2, the purpose of which is to increase the radiating surface of the cap 3 and to increase the size of the fluid pressure chamber 4, and the area of contact between the expansible fluid and the cap. This tubular extension 23 increases the condensing surface of the fluid pressure chamber. The essential point in this connection is that the condensing surface of this chamber which comes into contact with the air of the room, should be increased. This makes the valve more sensitive in its operation in that it responds more quickly to the change of condition in the room temperature.

The operation of this form of valve shown in Fig. 3 is the same as that shown in Fig. 1 with two additional features. In the first place, the spring disk 19 tends to resist the downward or inward motion of the diaphragm which results from a heating of the contents of the chamber 4. As the diaphragm is forced inwardly the resistance offered by the disk 19 becomes greater and greater until the inner surface of the disk strikes the surface 9 of the casing, when the downward motion of the diaphragm is arrested, this surface 9 acting as a stop. The disk 19 can be made of such thickness and size and strength, that when the diaphragm is moved inwardly sufficiently to close, or substantially close, the valve, the upward pressure of the disk nearly counterbalances the downward pressure of the diaphragm. It follows from this that as soon as the temperature of the expansible fluid is decreased, even to a very slight extent, the spring disk will force the diaphragm upwardly and thereby open the valve to some extent. This makes the valve very accurate and sensitive in its operation, and makes it respond to very slight changes of temperature. The pressure of the fluid upon the inside of the valve is exerted on the under face of the diaphragm through the passage 22 and operates as already explained in connection with Fig. 1. The face of the casing is cut away at 24 so as to permit the inner part of the disk 19 to be bent down a little in case a sufficiently high pressure is exerted in the fluid pressure chamber 4.

Referring to Fig. 4, certain parts are the same as shown in Fig. 1, and these parts are similarly numbered. In this form of valve there are two spring disks of different sizes. 25 is a large spring disk held at its outer edge or circumference between the cap 2 and the washer 8. It is made of any suitable spring metal and is bent upwardly at its middle portion and is secured to the valve stem 11 between the nut 26 which is screwed onto the upper end of the valve stem, and the collar 27 which encircles the valve stem and separates the two spring disks. 28 is a smaller spring disk which is carried at its middle portion by the valve stem and is held in place thereon by the collar 27 and the collar 29. The collar 29 is held in place by the lock nut 30 which is screwed onto the valve stem 11 as shown. The disk 28 is provided with a hole or aperture 31 through which the fluid pressure on the inlet side of the valve gains access to the chamber 32 formed between the two disks. The valve stem 11 is provided with a central passage 33 which, when the valve is closed, connects the discharge pipe on the outlet side of the valve with the fluid chamber 34 which is between the diaphragm and the larger disk 25. The casing is cut out at 35 below the inner disk so as to permit the two spring disks to be bent inwardly to some extent at their middle portion in case of a specially high pressure in the fluid pressure chamber 4. The valve proper 13 is fastened to the stem 11 by means of a ball and socket joint 36 as shown, in order to give the valve a capacity adjustment upon the valve stem so that if the valve seat and the stem are not in exact alinement, the valve will adjust itself in such variation and will be firmly and uniformly seated without bending or cramping the stem or the disk.

The operation of the form of valve shown in Fig. 4 is as follows: Assuming that the valve is in its normal open position as represented in Fig. 4, if air or cold water comes to the valve it will flow out without affecting the position thereof. When steam or hot water flows into the valve, heat will be transmitted through the disks and the diaphragm to the expansible fluid in the chamber 4, and the diaphragm will be forced downwardly, thereby tending to close or substantially close the valve. When the diaphragm is moved downwardly it bends the two spring disks downwardly at the center, the disks resisting the action of the diaphragm in closing the valve. The downward motion of the diaphragm continues, if the heat is sufficient, until the lower disk is pressed flat against the surface 9 of the casing, when the downward motion is arrested. The parts are so adjusted that in this position the valve will be entirely or substantially closed. Should the expansible fluid be still further expanded, the lower disk will be bent down still farther at the lower portion until it comes into contact with the surface 35. The downward motion of the diaphragm is also resisted by whatever pressure there may be in the radiator outlet, this pressure acting against the lower surface of the disk 28 and having access through the opening 31 to the space between the two disks and thereby acting on the larger disk 25. The disks are so constructed and arranged in combination with the other parts, that when the valve has been seated or substantially so, the spring pressure produced by the two disks substantially, or practically, balances the pressure of the diaphragm in conjunction with the pressure in the radiator outlet. The spring disks are preferably made of such strength and thickness that at atmospheric pressure within the radiator, that is to say, when the contents of the radiator are at a pressure of 212° Fahrenheit, the upward pressure of the disks will substantially balance the downward pressure of the diaphragm when the valve is closed. If the temperature in the radiator should rise to say 226°, which corresponds with a pressure of five pounds, the increased temperature will tend to expand the fluid and force the valve more tightly against its seat, but this tendency is resisted by the increased pressure, which is now five pounds greater, operating against the lower surface of the two spring disks. This increased pressure, tending to hold the valve open, will substantially balance the increased pressure tending to close the valve so that, as I have found in practice, the valve will work equally well at the varying temperatures at least within ordinary ranges. One advantage of this operation is that the parts of the valve do not need to be adjusted for different pressures or temperatures.

The operation of the valve is also affected by the temperature of the room which has an influence upon the expansible member through the wall of the casing and cap. The air of the room comes into contact with the casing and the cap 2, and is heated thereby, and a circulation past the valve is thus produced. This tends to cool the expansible fluid, and thereby tends to open the valve. As the air of the room becomes heated, the amount of heat carried off by the air becomes less, and this tends to close the valve and hold it in a closed, or nearly closed, position. If the temperature of the room falls, it has the reverse effect.

When the contents of the valve drop in temperature the expansible fluid is cooled and the diaphragm is moved upwardly so as to open the valve. This operation is materially assisted by the spring disks. As soon as the temperature of the expansible fluid is decreased, even slightly, the pressure of the disks is sufficient to cause the diaphragm to move upwardly and to again open the valve. The valve is thus very sensitive in its operation and responds to slight changes of temperature and pressure on the supply side of the valve. When the valve is closed the circulation in the valve ceases and the valve practically becomes a dead end. The result of this is that the film of water which is closest to the disk and to the stem becomes quickly cooled and thereafter obstructs the transmission of heat to those parts and to the expansible fluid so that the temperature of the expansible fluid tends to fall quickly under such conditions, thereby operating to withdraw the valve from its seat. When the valve is shut and has thus become a dead end, there is also a tendency for air to collect in the same, and as soon as this happens there is a resulting fall of temperature in the expansible fluid which tends to open the valve.

Fig. 5 shows another modification of the invention in which a single spring disk 19 is employed as in the form shown in Fig. 3. Many of the parts are the same as those already described, and these parts are similarly numbered. The tube 5 is provided at its lower end with openings 37 which permit the expansible fluid to have access to the tube when the diaphragm 3 comes into contact with the lower end of the tube. The upper end of the cap 2 is provided with a projection or boss 38 which is provided with a recess as shown, which forms a part of the expansible chamber 4. This projection or boss 38 increases the condensing surface of the chamber 4 which is exposed to the action of the outside temperature. The disk 19 is secured to the valve stem 11 between the nuts 39 and 40 which are screwed onto the stem 11 as shown. The lower end of the stem 11 is provided with a screw threaded aperture into which the stem 41 is screwed, this stem 41 carrying the valve 13 at its lower end. By screwing the stem 41 upwardly or downwardly in the stem 11 the position of the valve 13 can be adjusted. After it has been adjusted it is secured in place by the lock nut 42. The operation of this form of device is substantially the same as that of the form shown in Fig. 3.

Many advantages are secured by my invention. The air and water and gases entering the valve from the radiator or heater, are discharged freely and continuously, while steam, or the heating agent, is prevented from escaping. The operation of the valve is controlled partly by the temperature and pressure of the fluids entering the valve, and partly by the temperature of the external atmosphere in the room or other place that is being heated. If the temperature of the outside atmosphere rises, this rise in temperature tends to hold the valve shut, which is a desirable result. If the temperature of the outside atmosphere falls, the fall in temperature tends to open the valve and thereby to increase the heating effect of the system. Any fall in temperature of the contents of the valve tends to open the valve, and to allow the contents thereof to be discharged, thereby securing the satisfactory removal of water, air and gases. Any increase of pressure within the valve tends to open the valve. These different forces so coöperate with one another as to make the valve very sensitive and to make it operate automatically and satisfactorily within narrow ranges of temperature.

What I claim as new and desire to secure by Letters Patent, is:

1. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid passing through said valve device on the inlet side of the valve proper, the casing of the valve device being provided with a surface to act as a stop to limit the motion of the diaphragm toward the valve seat, a valve proper adapted to be moved by the diaphragm and a seat for said valve.

2. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature and pressure of the fluid passing through said valve device on the inlet side of the valve proper, the casing of the valve device being provided with a surface to act as a stop to limit the motion of the diaphragm toward the valve seat, a valve proper adapted to be moved by the diaphragm and a seat for said valve.

3. In a valve device for use in heating systems, the combination of a chamber for an expansible fluid, the inner wall of said chamber consisting of a movable diaphragm adapted to be exposed to the temperature of the fluid passing through said valve device, a spring disk between the diaphragm and the wall of the casing adapted to resist the motion of the diaphragm toward the valve seat, a valve proper adapted to be moved by the diaphragm, and a seat for said valve.

4. In a valve device for use in heating systems, the combination of a chamber for an expansible fluid, the inner wall of said chamber consisting of a movable diaphragm adapted to be exposed to the temperature of the fluid passing through said valve device, a valve stem adapted to be moved by the diaphragm, a spring disk surrounding the valve stem and between the diaphragm and the wall of the casing adapted to resist the motion of the diaphragm toward the valve seat, a valve proper adapted to be moved by the diaphragm, and a seat for said valve.

5. In a valve device for use in heating systems, the combination of a chamber for an expansible fluid, the inner wall of said chamber consisting of a movable diaphragm adapted to be exposed to the temperature of the fluid passing through said valve device, a valve stem adapted to be moved by the diaphragm, a spring disk surrounding the valve stem and carried thereby and between the diaphragm and the wall of the casing adapted to resist the motion of the diaphragm toward the valve seat, a valve proper adapted to be moved by the diaphragm, and a seat for said valve.

6. In a valve device for use in heating systems, the combination of a chamber for an expansible fluid, the inner wall of said chamber consisting of a movable diaphragm adapted to be exposed to the temperature of the fluid passing through said valve device, a valve stem adapted to be moved by the diaphragm, a spring disk surrounding the valve stem and between the diaphragm and the wall of the casing adapted to resist the motion of the diaphragm toward the valve seat, the casing being provided with a surface to act as a stop to limit the motion of the disk toward the valve seat.

7. In a valve device for use in heating systems, the combination of a chamber for an expansible fluid, the inner wall of said chamber consisting of a movable diaphragm adapted to be exposed to the temperature of the fluid passing through said valve device, a plurality of spring disks of different sizes between the diaphragm and the wall of the casing adapted to resist the motion of the diaphragm toward the valve seat, a valve proper adapted to be moved by the diaphragm and a seat for said valve.

8. In a valve device for use in heating systems, the combination of a chamber for an expansible fluid, the inner wall of said chamber consisting of a movable diaphragm adapted to be exposed to the temperature of the fluid passing through said valve device, a valve stem adapted to be moved by the diaphragm, a plurality of spring disks of different sizes between the diaphragm and the wall of the casing and surrounding the valve stem, adapted to resist the motion of the diaphragm toward the valve seat, a valve proper adapted to be moved by the diaphragm and a seat for said valve.

9. In a valve device for use in heating systems, the combination of a chamber for an expansible fluid, the inner wall of said chamber consisting of a movable diaphragm adapted to be exposed to the temperature of the fluid passing through said valve device, a valve stem adapted to be moved by the diaphragm, a plurality of spring disks of different sizes between the diaphragm and the wall of the casing and surrounding the valve stem and carried thereby, adapted to resist the motion of the diaphragm toward the valve seat, a valve proper adapted to be moved by the diaphragm and a seat for said valve.

10. In a valve device for use in heating systems, the combination of a chamber for an expansible fluid, the inner wall of said chamber consisting of a movable diaphragm adapted to be exposed to the temperature of the fluid passing through said valve device, a plurality of spring disks of different sizes between the diaphragm and the wall of the casing adapted to resist the motion of the diaphragm toward the valve seat, a stop carried by the casing to limit the motion of the disks toward the valve seat, a valve proper adapted to be moved by the diaphragm and a seat for said valve.

11. In a valve device for use in heating systems, the combination of a chamber for an expansible fluid, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a valve stem extending through the disk and adapted to be moved by the diaphragm, a passage through said stem connecting the fluid pressure chamber with the discharge passage beyond the valve proper when the valve is closed, a valve proper carried by the stem and a seat for said valve.

12. In a valve device for use in heating systems, the combination of a chamber for an expansible fluid, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a stop carried by the casing to limit the motion of the disk toward the valve seat, a valve stem extending through the disk and adapted to be moved by the diaphragm, a passage through said stem connecting the fluid pressure chamber with the discharge passage beyond the valve proper when the valve is closed, a valve proper carried by the stem and a seat for said valve.

13. In a valve device for use in heating systems, the combination of a chamber for an expansible fluid, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a second spring disk between the first disk and the casing, a valve stem extending through the disks and adapted to be moved by the diaphragm, a passage through said stem connecting the fluid pressure chamber with the discharge passage beyond the valve proper when the valve is closed, a valve proper carried by the stem and a seat for said valve.

14. In a valve device for use in heating systems, the combination of a chamber for an expansible fluid, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a second spring disk between the first disk and the casing, a valve stem extending through the disks, both disks carried by the valve stem and adapted to be moved by the diaphragm, a passage through said stem connecting the fluid pressure chamber with the discharge passage beyond the valve proper when the valve is closed, a valve proper carried by the stem and a seat for said valve.

15. In a valve device for use in heating systems, the combination of a chamber for an expansible fluid, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a second spring disk between the first disk and the casing and perforated to permit the passage of fluid, a valve stem extending through the disks, both disks carried by the valve stem and adapted to be moved by the diaphragm, a passage through said stem connecting the fluid pressure chamber with the discharge passage beyond the valve proper when the valve is closed, a valve proper carried by the stem and a seat for said valve.

16. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid passing through said valve device, a spring disk between the diaphragm and the wall of the casing adapted to resist the motion of the diaphragm toward the valve seat, a valve proper adapted to be moved by the diaphragm, and a seat for said valve.

17. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid passing through said valve device, a valve stem adapted to be moved by the diaphragm, a spring disk surrounding the valve stem and between the diaphragm and the wall of the casing, adapted to resist the motion of the diaphragm toward the valve seat, the casing being provided with a surface to act as a stop to limit the motion of the disk toward the valve seat.

18. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid passing through said valve device, a plurality of spring disks of different sizes between the diaphragm and the wall of the casing adapted to resist the motion of the diaphragm toward the valve seat, a valve proper adapted to be moved by the diaphragm and a seat for said valve.

19. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid passing through said valve device, a plurality of spring disks of different sizes between the diaphragm and the wall of the casing adapted to resist the motion of the diaphragm toward the valve seat, a stop carried by the casing to limit the motion of the disks toward the valve seat, a valve proper adapted to be moved by the diaphragm and a seat for said valve.

20. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid of the inlet side of the valve device, a spring disk between the diaphragm and the wall of the casing and forming a fluid pressure chamber between it and the diaphragm and adapted to resist the motion of the diaphragm toward the valve seat, a valve stem extending through the disk and adapted to be moved by the diaphragm, a passage through said stem connecting the fluid pressure chamber with the discharge passage beyond the valve proper when the valve is closed, a valve proper carried by the stem and a seat for said valve.

21. In a valve device for use in heating systems the combination of a chamber for an expansible fluid, the outer wall of said chamber being adapted to be exposed to the temperature of the room to be heated, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a second spring disk between the first disk and the casing, a valve stem extending through the disks and adapted to be moved by the diaphragm, a passage through said stem connecting the fluid pressure chamber with the discharge passage beyond the valve proper when the valve is closed, a valve proper carried by the stem and a seat for said valve.

22. In a valve device for use in heating systems, the combination of a chamber for an expansible fluid, the outer wall of said chamber being adapted to be exposed to the temperature of the room to be heated, the inner wall of said chamber consisting of a movable diaphragm adapted to be exposed to the temperature of the fluid on the inlet side of the valve device, a spring disk between the diaphragm and the wall of the casing and forming a fluid pressure chamber between it and the diaphragm and adapted to resist the motion of the diaphragm toward the valve seat, a second spring disk between the first disk and the casing and perforated to permit the passage of fluid, a valve stem extending through the disks, both disks carried by the valve stem and adapted to be moved by the diaphragm, a passage through said stem connecting the fluid pressure chamber with the discharge passage beyond the valve proper when the valve is closed, a valve proper carried by the stem and a seat for said valve.

In testimony whereof I have signed my name to this specification in the presence of two subscribing witnesses.

ANDREW G. PAUL.

Witnesses:
   CHAS. W. BROWN,
   J. THOS. BALDWIN.